Patented June 6, 1939

2,161,556

UNITED STATES PATENT OFFICE 2,161,556

DIP-SOLDERING

Walter P. Carroll, Cicero, and Dimitrie S. Kondrat, Chicago, Ill., assignors to National Lead Company, New York, N. Y., a corporation of New Jersey No Drawing. Application November 11, 1937, Serial No. 174,063

2 Claims. (Cl. 113—112)

This invention is an improvement in the art of dip-coating or dip-soldering metallic articles such as automotive radiator cores and the like, and the objects are, in general, simplification of the process, improvement of the quality of the soldered product, and economy of solder.

These objects are accomplished according to this invention by floating on the solder bath a molten flux, in sufficient quantity and of the special character herein set forth, and dipping the article through the flux layer into the bath and removing it from the bath by lifting it out through the same flux. The effect of this procedure, and particularly of the second passage of the article through the flux layer, is to strip off all excess solder from it, which excess automatically falls back into the bath during the act of withdrawal thereby producing a soldered article or radiator core having a solder coating uniform all over and entirely free from the drops or globules customarily found on dip-soldered articles, so that the article at once appears to be, and is, uniformly plated with the solder in its recesses as well as on its outer faces, quite as though it had been electro-plated with the solder. It does not require to be brushed off while torch-heated as is commonly the practice and the process avoids entirely the need for any such treatment. The amount of solder saved is substantial. In a specific case, though not an unusual one, the solder saving was better than 50%; the amount of solder left on the core was 3.5 pounds as against 7.75 pounds for the same article dip-soldered in accordance with the long standing and customary practice and stripped by brushing. Obviously the weight of the finished core is reduced by the amount of solder saved, which of itself is desirable, and this without in any way impairing its utility.

The flux requisite for producing this effect is a mixture of commercial stannous chloride ($SnCl_2$), preferably anhydrous or substantially so, and zinc chloride ($ZnCl_2$) in the relative proportions of about 20% and 80% by weight respectively. These salts are melted on the surface of the solder bath to a depth of preferably several inches and desirably considerably more than necessary for merely preventing atmospheric oxidation of the bath, which function it also incidentally performs. In the proportions just stated the mixture is liquid in the range of temperatures ordinarily employed for dip-soldering and which may be stated as from 275° C. to 320° C. The proportions may however be varied according to conditions, observing that increase in the proportion of zinc chloride raises the melting point, and vice versa. Proportions of the stannous salt up to 64% (melting point 171° C.) can be used but between 10% and 30% is satisfactory and 20% is preferred.

This flux has the property of forming a thin or flash coat of tin on the article as it makes its first passage through it. Such coating, which is extremely thin, is deposited out of the stannous chloride in the molten mixture, as will be understood; it forms instantly on contact and before the article reaches the solder bath and its apparent effect is to alter the surface tension or wetting power of the solder upon the core surfaces so that, on withdrawal, the solder drains off quickly to an extremly thin, but uniform, film covering the whole of the article and as above described. Also in the second passage through the salt layer, the solder coating on the article acquires a thin coating of tin which gives it a bright appearance and protects the solder from corrosion.

Variation of the composition of the flux includes the use of other stannous halide salts in substitution for the chloride except that they are more expensive and some have higher melting points, and certain other salts may also be added without impairing the stripping property of the flux layer. We have found that zinc-ammonium chloride, $ZnCl_2NH_4Cl$, is such a salt and can be added in such proportion as to produce a fusion point for the mixture as low as 176° C., being perfectly fluid at 228° C. Such reduced fusion point may be necessary when the article to be soldered requires the use of a low melting solder, in order to avoid injury to it. The zinc-ammonium chloride can be added up to about 35% as a maximum in substitution for some of the zinc chloride and a satisfactory formula is about as follows:

| | Per cent |
|---|---|
| $ZnCl_2NH_4Cl$ | 30 |
| $ZnCl_2$ | 50 |
| $SnCl_2$ | 20 |

The melting point of this flux is less than the annealing temperature of electrolytic copper, of which radiator cores are sometimes made, and it suffices to strip the soldered article with quite the same effect as above described but without softening the copper.

On withdrawal of the core, it is hosed off with water and set aside to dry as a completed soldered core. Owing to the poor heat conductivity of these molten salts a crust constantly forms on the upper surface of the layer and pieces of this crust commonly cling to the core on its withdrawal, on which account it is desirable to collect the wash water in a suitable tank and from time to time evaporate it off for the recovery and reuse of this material.

We claim:

1. The process of dip-soldering metal articles which comprises floating a layer of molten salt mixture on a molten solder bath, such mixture containing zinc chloride and stannous chloride, the latter being present in the proportion of between 10% and 30% of the whole mixture, then passing the article directly through such molten layer into the bath and removing it therefrom by passing it a second time through said layer, said floating layer having a depth considerably more than necessary for merely preventing atmospheric oxidation of the solder bath, and serving to strip off excess solder as it is removed from said bath and tin-coat the solder that remains.

2. The process of dip-soldering metal articles which comprises floating a layer of molten salt mixture on a molten solder bath, such mixture containing zinc-chloride about 50%, zinc-ammonium chloride about 30% stannous chloride about 20%, then passing the article directly through such molten layer into the bath and removing it therefrom by passing it a second time through said layer, said floating layer having a depth considerably more than necessary for merely preventing atmospheric oxidation of the solder bath, and serving to strip off excess solder as it is removed from said bath and tin-coat the solder that remains.

WALTER P. CARROLL.
DIMITRIE S. KONDRAT.